(12) United States Patent
Su (10) Patent No.: US 11,861,203 B2
(45) Date of Patent: Jan. 2, 2024

(54) METHOD, APPARATUS AND ELECTRONIC DEVICE FOR CLOUD SERVICE MIGRATION

(71) Applicant: Alibaba Group Holding Limited, Grand Cayman (KY)

(72) Inventor: Yubin Su, Hangzhou (CN)

(73) Assignee: ALIBABA GROUP HOLDING LIMITED, Grand cayman (KY)

( * ) Notice: Subject to any disclaimer, the term of this patent is extended or adjusted under 35 U.S.C. 154(b) by 197 days.

(21) Appl. No.: 16/765,755

(22) PCT Filed: Nov. 14, 2018

(86) PCT No.: PCT/CN2018/115383
§ 371 (c)(1),
(2) Date: May 20, 2020

(87) PCT Pub. No.: WO2019/100984
PCT Pub. Date: May 31, 2019

(65) Prior Publication Data
US 2020/0293216 A1    Sep. 17, 2020

(30) Foreign Application Priority Data
Nov. 24, 2017 (CN) .......................... 201711186691.9

(51) Int. Cl.
G06F 3/00 (2006.01)
G06F 3/06 (2006.01)
H04L 67/1097 (2022.01)

(52) U.S. Cl.
CPC .......... *G06F 3/0647* (2013.01); *G06F 3/0604* (2013.01); *G06F 3/067* (2013.01); *G06F 3/0632* (2013.01); *H04L 67/1097* (2013.01)

(58) Field of Classification Search
CPC .... G06F 3/0647; G06F 3/0604; G06F 3/0633; G06F 3/067; H04L 67/1097
See application file for complete search history.

(56) References Cited

U.S. PATENT DOCUMENTS 6,108,748 A * 8/2000 Ofek ...................... G11B 19/02
                                                        711/E12.083
8,943,285 B2    1/2015 Liu
(Continued)

FOREIGN PATENT DOCUMENTS

| CN | 103139221 A | 6/2013 |
| CN | 103297492 A | 9/2013 |
| CN | 107018193 A | 8/2017 |

OTHER PUBLICATIONS

Extended EP Search Report to corresponding EP Application No. 18880836 dated May 27, 2021 (10 pages).
(Continued)

*Primary Examiner* — Craig S Goldschmidt
(74) *Attorney, Agent, or Firm* — James J. DeCarlo; Greenberg Traurig, LLP (57) ABSTRACT

The disclosure provides a method and for cloud service migration. The method comprises: obtaining a migration request related to a cloud service hosted in a source cluster, the migration request comprising a scheduled migration time to migrate the cloud service from the source cluster to a target cluster; migrating, based on the scheduled migration time, disk data associated with an original instance of the cloud service to a disk for servicing a new instance of the cloud service instantiated in the target cluster, the migration of the disk data being performed based on a migration priority order of the disk data; and configuring a data operation of the cloud service for a disk for servicing the original instance as a data operation for the disk for servicing the new instance.

18 Claims, 5 Drawing Sheets

(56) References Cited

U.S. PATENT DOCUMENTS

| | | | |
|---|---|---|---|
| 9,201,606 B1 | 12/2015 | Taylor et al. | |
| 9,575,797 B2 | 2/2017 | Linton et al. | |
| 9,600,320 B2 | 3/2017 | Hamilton et al. | |
| 9,648,134 B2* | 5/2017 | Frank | H04L 67/34 |
| 9,672,054 B1 | 6/2017 | Gupta et al. | |
| 10,055,257 B2 | 8/2018 | Birkenstrand et al. | |
| 10,459,750 B2 | 10/2019 | Zhang et al. | |
| 10,491,689 B2 | 11/2019 | Kuchibhotla et al. | |
| 10,599,466 B2 | 3/2020 | Cao et al. | |
| 2007/0234107 A1 | 10/2007 | Davison | |
| 2009/0300719 A1 | 12/2009 | Ferris | |
| 2012/0221845 A1* | 8/2012 | Ferris | H04L 67/1097 |
| | | | 713/150 |
| 2013/0204963 A1 | 8/2013 | Boss et al. | |
| 2016/0292180 A1* | 10/2016 | Clifton | G06F 3/0619 |
| 2017/0024260 A1 | 1/2017 | Chandrasekaran et al. | |
| 2017/0091047 A1 | 3/2017 | Bangalore et al. | |
| 2017/0142217 A1* | 5/2017 | Misra | G06F 12/084 |
| 2017/0242871 A1 | 8/2017 | Kilaru et al. | |
| 2017/0262350 A1 | 9/2017 | Dornemann | |
| 2018/0052704 A1 | 2/2018 | Ohnishi | |
| 2018/0285353 A1 | 10/2018 | Rao et al. | |
| 2019/0369984 A1 | 12/2019 | Malladi et al. | |
| 2020/0097369 A1 | 3/2020 | Kilaru et al. | |
| 2020/0120038 A1 | 4/2020 | Martinez et al. | |

OTHER PUBLICATIONS

International Search Report to corresponding International Application No. PCT/CN2018/115383 dated Feb. 18, 2019 (2 pages).

* cited by examiner

METHOD, APPARATUS AND ELECTRONIC DEVICE FOR CLOUD SERVICE MIGRATION

The disclosure is a national stage entry of Int'l Appl. No. PCT/CN2018/115383,filed on Nov. 14, 2018, which claims priority to Chinese Patent Application No. 201711186691.9, filed on Nov. 24, 2017, both of which are incorporated herein by reference in their entirety.

BACKGROUND

Technical Field

The disclosure relates to the field of cloud computing, and in particular, to methods, apparatuses, and electronic devices for cloud service migration.

Description of the Related Art

With the increasing popularity and development of cloud computing, products based on the cloud computing technology have received increased attention such that more types of cloud products are becoming available. For example, cloud servers (e.g., Elastic Compute Services (ECSs)), a basic cloud computing service, can provide services as conveniently and efficiently as commodity resources such as water, electricity, gas, and so on, delivering a wide variety of applications. However, as cloud service providers gradually expand and build new data centers, users start to have more robust requirements for selecting geographic regions when using cloud services. On the other hand, since system architectures deployed based on cloud services continue to evolve and expand, there is also a need for re-adjusting cloud service distributions. Further, with adjustments in the scope of user services, there is also a need for migrating cloud services to priority promotion geo-areas to enhance user experiences.

Presently, cloud service providers have not provided any comprehensive solution addressing these above-described needs related to migrating cloud services. For example, the cloud computing service platform AWS (Amazon Web Services) from Amazon, Inc. of Seattle, Wash. only provides mirrored images of disks for servicing cloud services (e.g., disk mirroring). Users use these mirrored images to synchronize data via a mirroring image copy operation. Since the size of data on disks is generally in a magnitude of hundreds of gigabytes or even terabytes, it takes long to mirror the data, resulting in a prolonged service interruption. Further, except for the aspect of using mirroring to synchronize data, comprehensive migration of cloud services is not yet realized. Thus, users still need to handle configurations such as creating an instance of the cloud service, deploying application services, and configuring IP addresses of cloud servers. All of these operations entail a complicated migration process.

SUMMARY

The disclosure provides methods, apparatuses, and electronic devices for cloud service migration to solve the technical problems of extended service interruption times and complex operations associated with cloud service migration in the prior art.

In one embodiment, the disclosure provides a method for cloud service migration, the method comprising: obtaining a migration request related to a cloud service hosted in a source cluster, the migration request comprising a scheduled migration time to migrate the cloud service from the source cluster to a target cluster; migrating, based on the scheduled migration time, disk data associated with an original instance of the cloud service to a disk for servicing a new instance of the cloud service instantiated in the target cluster, the migration of the disk data being performed based on a migration priority order of the disk data; and configuring data operations of the original cloud service instance for a disk as data operations of the new cloud service instance for the disk for servicing the new instance.

In one embodiment, the method further comprises, before the configuring the data operations of the cloud service for the disk for servicing the original instance as the data operations for the disk for servicing the new instance: instantiating a new instance in the target cluster; configuring the new instance and resource components associated with the new instance; and terminating the original instance at the source cluster, and starting the new instance based on the resource components.

In one embodiment, the configuring the new instance and resource components associated with the new instance comprises: configuring, based on the configuration information of the original instance, the new instance in the target cluster using the same configuration as the configuration information; or configuring the new instance based on the configuration information obtained through a pre-configured configuration interface.

In one embodiment, the resource components comprise a disk. In another embodiment, the resource components further comprise at least one of the following: a CPU, a memory, an operating system, and a network connection.

In one embodiment, the configuring the new instance and resource components of the new instance comprises: allocating a network port in the target cluster; and releasing the cloud service from a network port at the source cluster, configuring the cloud service to the network port allocated at the target cluster and performing a routing update.

In one embodiment, the configuring the new instance and resource components of the new instance comprises: stopping data operations associated with the cloud service for the disk for servicing the original instance; allocating the disk for servicing the new instance in the target cluster; and after the allocation of the disk for servicing the new instance is completed, migrating, based on the scheduled migration time, disk data associated with an original instance of the cloud service to a disk for servicing a new instance of the cloud service instantiated in the target cluster, and configuring data operation of the cloud service for a disk for servicing the original instance as data operations for the disk for servicing the new instance.

In one embodiment, the migrating the disk data associated with an original instance of the cloud service to a disk for servicing a new instance of the cloud service instantiated in the target cluster comprises: splitting the disk data associated with the original instance into at least one data block, and copying the disk data associated with the original instance to the disk for servicing the new instance in the form of data blocks; or splitting the disk data associated with the original instance into at least one data block, and creating a data mirroring image corresponding to each data block, and copying the disk data associated with the original instance to the disk for servicing the new instance via data mirroring.

In one embodiment, the data block is configured with a flag bit for marking whether the data block has been copied. In the process of copying the disk data associated with the original instance to the disk for servicing the new instance, data that is already copied is compared with the disk data associated with the original instance based on the flag bit to determine copying progress for the disk data associated with the original instance.

In one embodiment, the original instance and the new instance are each configured with respective processing queues. A data request including a data operation of the cloud service for the disk for servicing the original instance is enqueued to the processing queue of the original instance, and a data request including a data operation of the cloud service for the disk for servicing the new instance is enqueued to the processing queue of the new instance.

In one embodiment, after configuring a data operation of the cloud service for a disk for servicing the original instance as a data operation for the disk for servicing the new instance, a data request including a data operation of the cloud service for the disk for servicing the new instance is enqueued to the processing queue of the new instance, and a data request in the processing queue of the original instance, for which the processing is not completed, is transferred to the processing queue of the new instance for processing.

In one embodiment, a migration priority of the disk data is determined by determining whether the data involved in the data request exists in the disk for servicing the new instance; in response to determining that the data involved in the data request does not exist in the disk for servicing the new instance, configuring r a migration priority of the data involved in the data request to a high migration priority; and in the process of migrating the disk data associated with the original instance to the disk for servicing the new instance of the cloud service instantiated in the target cluster, performing the migration in descending order of migration priorities.

In one embodiment, the processing of a data request in the processing queue of the new instance comprises: determining whether the data involved in the data request exists in the disk for servicing the new instance, and in response to determining that the data involved in the data request exists in the disk for servicing the new instance, performing a data operation included the data request for the disk for servicing the new instance; and in response to determining that the data involved in the data request does not exist in the disk for servicing the new instance, migrating the data of the high migration priority from the disk for servicing the original instance to the disk for servicing the new instance, and performing the data operation included in the data request for the disk for servicing the new instance, upon the completion of the migration of the data.

In one embodiment, the source cluster and the target cluster are configured in different availability zones.

In one embodiment, the cloud service is configured as a cloud server for providing a cloud computing service. In another embodiment, the source cluster includes a cloud server cluster of at least one cloud server, and the target cluster includes a cloud server cluster of at least one cloud server.

In one embodiment, the disclosure provides an apparatus for cloud service migration, the apparatus comprising: a migration request obtaining unit configured to obtain a migration request related to a cloud service in a source cluster, the migration request comprising a scheduled migration time to migrate the cloud service from the source cluster to a target cluster; a disk migrating unit configured to migrate, based on the scheduled migration time, disk data associated with an original instance of the cloud service to a disk allocated in the target cluster for servicing a new instance of the cloud service instantiated in the target cluster, the migration of the disk data being performed based on a migration priority order of the disk data; and a data operation configuring unit configured to configure a data operation of the cloud service for a disk for servicing the original instance as a data operation for the disk for servicing the new instance.

In one embodiment, the disclosure provides an electronic device, the electric device comprising: a memory, and a processor, wherein the memory is coupled to the processor and configured to store computer-readable instructions when read and executed by the processor causing the electronic device to obtain a migration request related to a cloud service hosted in a source cluster, the migration request comprising a scheduled migration time to migrate the cloud service from the source cluster to a target cluster; migrating, based on the scheduled migration time, disk data associated with an original instance of the cloud service to a disk for servicing a new instance of the cloud service instantiated in the target cluster, the migration of the disk data being performed based on a migration priority order of the disk data; and configuring a data operation of the cloud service for a disk for servicing the original instance as a data operation for the disk for servicing the new instance.

In one embodiment, the disclosure provides a method for cloud service migration, the method comprising: obtaining a migration request related to a cloud service hosted in a source cluster, the migration request comprising a scheduled migration time to migrate the cloud service from the source cluster to a target cluster; migrating, based on the scheduled migration time, disk data associated with an original instance of the cloud service to a disk for servicing a new instance of the cloud service instantiated in the target cluster, the migration of the disk data being performed based on a migration priority order of the disk data; and configuring a data operation of the cloud service for a disk for servicing the original instance as a data operation for the disk for servicing the new instance.

According to various embodiments, the cloud service migration method provides, in the process of migrating a cloud service from a source cluster to a target cluster, based on a scheduled migration time that is specified by a user and included in a migration request for the cloud service, disk data of the cloud service in the source cluster is migrated to the target cluster based on the scheduled migration time, and a data operation of the cloud service for a disk in the source cluster is re-configured as a data operation for a disk in the target cluster to provide the service via a new instance in the target cluster. This way, the cloud service is migrated from the source cluster to the target cluster with simplified techniques, reducing potential service interruption time caused by the interruption of a cloud service provided by a cloud service instance, and thereby achieving improved efficiency and convenience in service migration.

DETAILED DESCRIPTION

Many specific details are set forth in the following description to facilitate a full understanding of the disclosure. However, the disclosure can be implemented in many other manners than that is described herein, and those skilled in the art can make similar derivations without departing from the essence of the disclosure, and the disclosure is not limited by the specific implementations described below.

The disclosure provides methods, apparatuses, and electronic devices for cloud service. The drawings in the following are some embodiments of the disclosure, which are described in detail below.

Figure 1:
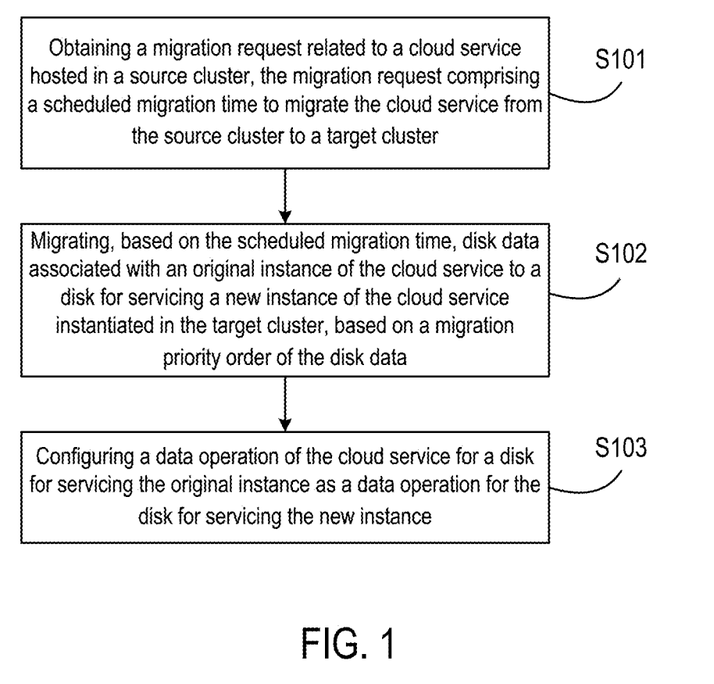
FIG. 1 is a flow diagram illustrating a method for cloud service migration according to some embodiments of the disclosure.

FIG. 1 illustrates a process for cloud service migration according to some embodiments of the disclosure. As shown in FIG. 1, the process of cloud service migration includes the following steps. In the illustrated embodiment, the methods described herein may be performed by a cloud computing platform or similar system.

Step S101: obtain a migration request related to a cloud service hosted in a source cluster.

As used herein, the cloud service refers to a cloud server (e.g., Elastic Compute Service (ECS)) that provides a basic cloud computing service. A user using the cloud server does not need to purchase hardware devices in advance. Instead, the user creates a required number of cloud server instances based on the service needs. During the use of the cloud server, the user may expand or reduce disk volumes, increase or decrease network bandwidth, and the like with regard to the cloud server based on the changes in the actual service. In some scenarios, the user may release the resources associated with the cloud servers that are no longer in use. As a virtual computing environment, a cloud server instance includes necessary server resource components such as a CPU, a memory, an operating system, a disk, a network bandwidth, etc. A cloud server instance is an operating entity provided by the cloud server to each user, each cloud server instance being a virtual machine. The user may, via management permissions associated with the cloud server instance, perform operations such as disk mounting, caching, image mirroring, environment deployment, and the like, on the cloud server instance.

In general, a geographic region is configured with one or more availability zones. As used herein, an availability zone refers to one or more data centers within the same region, where infrastructure such as electricity supply, communication network, and so on are isolated from each other. As such, faults are isolated between availability zones, and the network delay of cloud server instances is less in the same availability zone. Whether to place cloud server instances in the same availability zone depends on the requirements of the disaster tolerability as well as network delay sensibility. If there are heightened requirements for disaster tolerability, cloud server instances are deployed in different availability zones of the same geographic region. If there are heightened requirements for network delay sensibility, cloud server instances are deployed in the same availability zone of the same geographic region. Generally, a data center in the availability zone is a cloud server cluster of a plurality of cloud servers. In one example, the plurality of cloud server clusters deployed in isolation from each other is in the same availability zone.

According to various embodiments, the method for cloud service migration may be for migrating a cloud server across availability zones within the same geographic region, or for migrating a cloud server from an availability zone in one geographic region to an availability zone in another geographic region. In some embodiments, between two availability zones, a cloud server in a first cloud server cluster in a first availability zone is migrated to a second cloud server cluster in a second availability zone. In other words, the cloud server is migrated from a source cloud server cluster (source cluster) to a target cloud server cluster (target cluster).

In migrating a cloud server from the source cloud server cluster to the target cloud server cluster, the number of cloud servers for migration is not fixed, determined based on the actual service requirements. For simplicity, only a single cloud server is illustrated for migration as an example, to which the migration of multiple cloud servers is similar and not described in detail herein.

Figure 2:
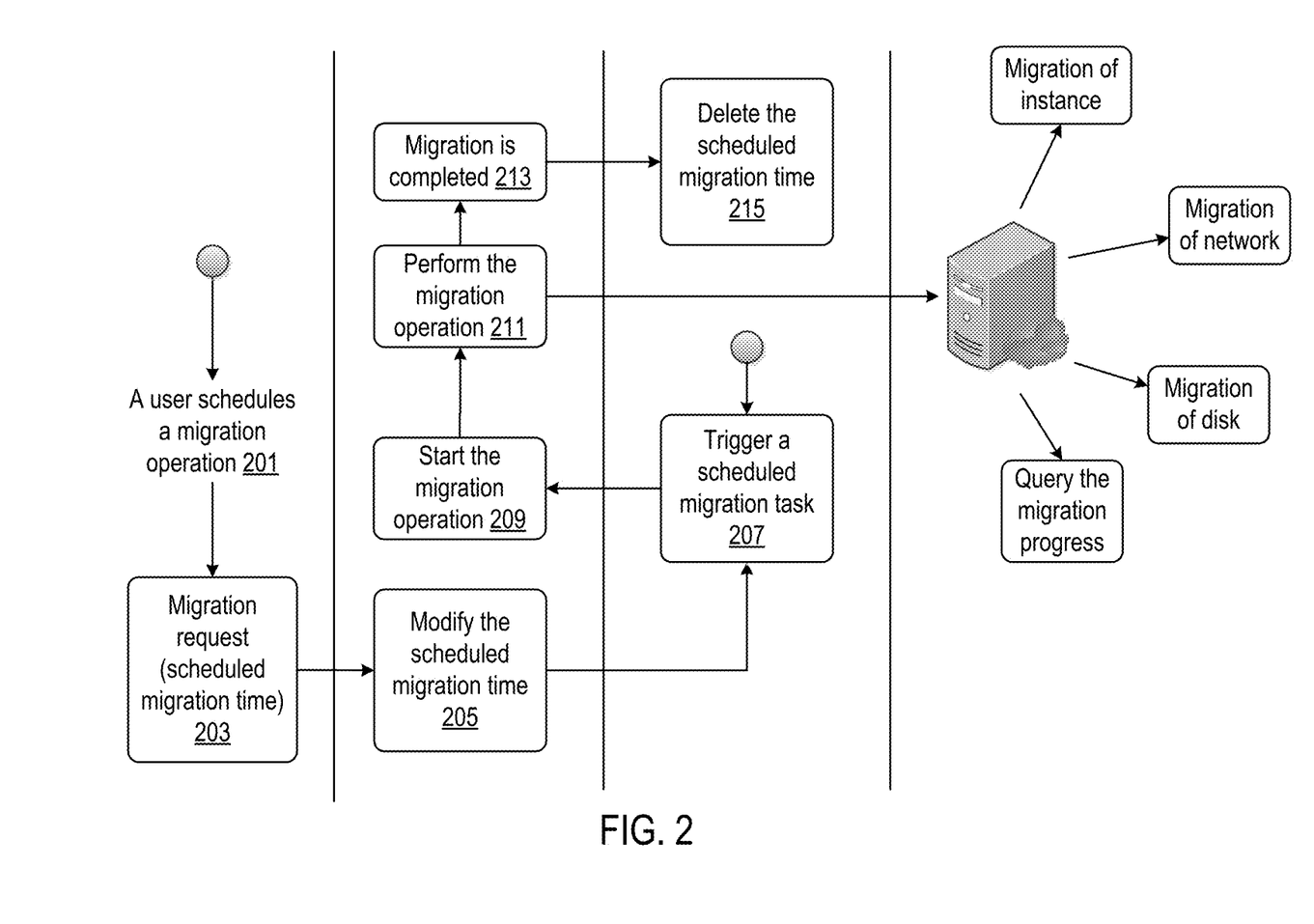
FIG. 2 is a schematic diagram illustrating a cloud server migration according to some embodiments of the disclosure.

In this step, a migration request related to a cloud server hosted in the source cloud server cluster is obtained. In one embodiment, the migration request includes a scheduled migration time to migrate the cloud server from the source cloud server cluster to the target cloud server cluster. In other words, the cloud server is migrated in a pre-scheduled manner. For example, the scheduled migration time can be scheduled using a timer. Upon the timer being triggered (e.g., the lapse of time duration until the present time according to the timer reaches the scheduled point of time for migration), the migration operation is performed to migrate the cloud server from the source cloud server cluster to the target cloud server cluster. As shown in FIG. 2, to migrate the cloud server from the source cloud server cluster to the target cloud server cluster at a specific point of time, the user schedules a migration operation (201) for the cloud server to be migrated. In one embodiment, a timer is configured to expire at a scheduled migration time based on the time specified by the user. When the timer is triggered (207) (e.g., the present time according to the timer reaches the scheduled migration time), the migration operation is started and performed (209, 211) to migrate the cloud server.

In some embodiments, after the migration operation related to the cloud server is scheduled (203) (e.g., the migration time is specified by the user), the scheduled migration time may need to be modified (205) due to actual service requirements. For example, given that a user service provided by the cloud service hosted by the cloud server instance is busy, the scheduled migration time needs to be postponed. In this scenario, the scheduled migration time can be accordingly modified to a later time specified by the user. Similarly, given that the promotion on the user service provided by the cloud service hosted by the cloud server instance exceeds the expected results, the original plan of deploying a cloud server in one new availability zone can be accordingly adjusted to deploying the cloud server in a plurality of new availability zones. Further, the migration task can also be modified to change the target cloud server cluster corresponding to the migration task from one target cloud server cluster to a plurality of target cloud server clusters, which is equivalent to adding a migration task of migrating the cloud server to the cloud server clusters in the newly allocated availability zones.

Step S102: migrate, based on the scheduled migration time, disk data associated with an original instance of the cloud service to a disk where for servicing a new instance of the cloud service instantiated in the target cluster.

In the above-described step S101, a migration request for migrating a cloud server from the source cloud server cluster to the target cloud server cluster is obtained, and a migration time is determined based on a scheduled migration time included in the migration request. In step S102, disk data associated with an original instance of the cloud server in the source cloud server cluster is migrated to a disk for servicing a new instance of the cloud server instantiated in the target cloud server cluster, based on the scheduled migration time.

In some embodiments of the disclosure, before the disk data associated with the original instance of the cloud server in the source cloud server cluster is migrated to a disk for servicing a new instance of the cloud server instantiated in the target cloud server cluster, the following operations are performed.

1) Instantiate the New Instance of the Cloud Server in the Target Cloud Server Cluster After obtaining a migration request for migrating a cloud server in the source cloud server cluster to the target cloud server cluster via the above-described step S101, and during the process of migrating the cloud server from the source cloud server cluster to the target cloud server cluster, an instance (e.g., a new instance) of the cloud server is first instantiated in the target cloud server cluster. As shown in FIG. 2, to migrate the cloud server from the source cloud server cluster to the target cloud server cluster at a specific scheduled migration time, after the migration request for the cloud server is obtained, the migration operation for the cloud server is performed (209, 211) based on a trigger (207) associated with the scheduled migration time included in the migration request. In this example, the new instance of the cloud server is instantiated in the target cloud server cluster.

2) Configure the New Instance of the Cloud Server and the Resource Components Associated With the New Instance As described above, the cloud server instance is a virtual computing environment, including necessary server resource components such as a CPU, a memory, an operating system, a disk, network bandwidth, and the like. In one embodiment, resources used by the cloud server are classified into three categories: an instance, a network connection, and storage (e.g., disk). The following illustrates a migration process of the instance resources and network resources as an example to describe the configuration of in the new instance of the cloud server instantiated in the target cloud server cluster, and the configuration of resource components for of the new instance.

a. New Instance of the Cloud Server

As used herein, an instance of a cloud server refers to a collected utilization of CPU and memory resources, the configuration of which is illustrated through its configuration. For example, for a configuration of {core: 2, memory: 2048} indicates an instance being configured with a CPU of 2 cores and a memory of a size of 2 GB. The management of the cloud server is implemented by an upper-layer cloud control system, which includes the migration management on cloud servers as a necessary function. As such, migration of the instance of the cloud server is implemented by the cloud control system releasing the original instance of the cloud server in the source cloud server cluster, transmitting an instantiation request to the target cloud server cluster with the same configuration based on the configuration information of the original instance of the cloud server, and configuring the instantiated new instance with the same configuration in the target cloud server cluster. The migration of the instance of the cloud server is completed (213) upon completion of the configuration. In some embodiments, after completing the migration, the scheduled migration time is deleted (215).

Further, in implementations, with the increasing scale of the user service to be provided by the cloud service hosted by the cloud server instance, the user intends the cloud service to support the user service on a larger scale. In other words, the new instance of the cloud server providing the cloud service needs to be configured with more resources. In such a case where the configuration of the new instance of the cloud server differs from that of the original instance, a configuration interface for configuring the new instance of the cloud server is provided. This way, the user submits the self-defined configuration information for the new instance via the configuration interface, after which the configuration information submitted by the user is obtained at the configuration interface. The new instance is configured based on the obtained configuration information to accommodate the requirements of the user service better.

b. Network of the Cloud Server

In one embodiment, network migration is implemented by a routing advertisement process, which allocates and releases network port(s) associated with the cloud server by the cloud control system. In one example, such process includes allocating a network port for the cloud server in the target cloud server cluster, and based on the network configuration information transmitted by the cloud control system, releasing the cloud service from the network port at the source cloud server cluster, configuring the cloud service to the network port allocated in the target cloud server cluster, and completing the routing update and Address Resolution Protocol (ARP) advertisement. This way, terminal ports are notified via broadcasting that the network port associated with the cloud server changes from the source cloud server cluster to the target cloud server cluster.

In one embodiment, during network migration, the user keeps an IP address before and after the migration. As such, in a geographic region of a proprietary network, the IP address is reachable in all availability zones within the geographic region. Alternatively, the user may choose to change the IP address, for which only a new relationship needs to be established to map between the IP address before the migration and the IP address after the migration. However, sometimes accessing an IP address from across the geographic regions leads to degraded quality in network access. Thus, to ensure network access quality, in one example, the migration of the IP address is only performed when the IP addresses belong within the same geographic region so as to ensure high efficiency in accessing the service.

3) Terminate the Original Instance in the Source Cloud Server Cluster, and Start the New Instance Instantiated in the Target Cloud Server Cluster Based on the Resource Components In this step, after configuring the new instance and the resource components of the new instance in the above-described operations, the original instance of the cloud server is terminated at the source server cluster. The new instance of the cloud server is then started based on the resource components, the new instance of the cloud server being able to provide the service to users.

In one embodiment, before migrating the disk data associated with an original instance of the cloud server in the source cloud server cluster to a disk for servicing a new instance of the cloud server instantiated in the target cloud server cluster based on the scheduled migration time, the following operations are performed. The operations include stopping data operation(s) (including read and write operations) of the cloud service for the disk for servicing the original instance. The operations further include allocating the disk for servicing or the new instance at the target cloud server cluster, based on which the disk data associated with the original instance of the cloud server in the source cloud server cluster is migrated to the disk for servicing the new instance of the cloud server instantiated in the target cloud server cluster. In implementations, the original instance of the cloud server and the new instance of the cloud server each has their own respective processing queues. Such processing queues include an original instance processing queue to which a data request (including a read or write request) including the data operation(s) of the cloud server for n the disk for servicing the original instance is to enqueued for processing; as well as a new instance processing queue to which a read or write request including the data operation(s) of the cloud server for the disk for servicing the new instance is enqueued for processing.

Figure 3:
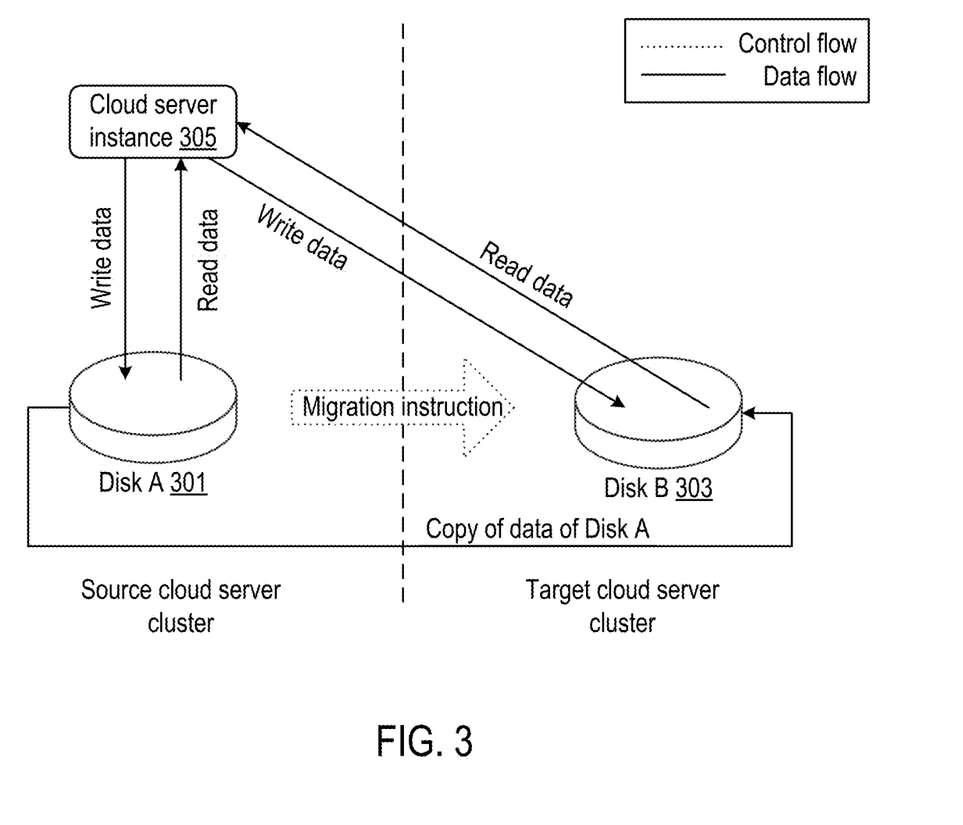
FIG. 3 is a schematic diagram illustrating the migration of a disk for servicing a cloud server instance according to some embodiments of the disclosure.

Turning to FIG. 3, a flow diagram illustrating the migration of a disk for servicing cloud services according to some embodiments of the disclosure. As shown in FIG. 3, disk A (301) is allocated in the source server cluster to service the cloud server that is to be migrated. The cloud server is configured to read data from and write data to disk A. When an upper layer of the cloud system issues a migration instruction related to disk A (301), disk A (301) is configured to stop all of the read and write operations. Further, the processing queue of the original instance stops processing the read and write requests enqueued therein. And, disk A (301) is marked with a to-be-deleted state. A disk B (303) for servicing the cloud server is allocated in the target cloud server cluster, after which disk B (303) is configured to start providing a read and write service. For example, a read or write request including a read or write operation for disk B (303) is enqueued to the processing queue of the new instance, and read and write operations of the new instance are all performed for disk B (303). Once the processing queue of the original instance stops dequeuing read/write requests therein for processing, a read/write request that is in the processing queue of the original instance and not completed in processing is transferred to the processing queue of the new instance for processing.

In some embodiments, the disk data associated with the original instance is copied to the disk for servicing the new instance via the execution of a background thread. In one example, a migration priority is configured for the disk data during migration, and migration of the disk data associated with the original instance is initiated with a configuration of a low migration priority. If a read/write operation is performed by the new instance during the migration, it is determined whether the data involved in the data request exists in the disk for servicing the new instance. In response to determining that the data does not exist on the disk for servicing the new instance of the cloud server, the migration priority of the data involved in the data request is set to a high migration priority. This way, in the process of migrating the disk data associated with the original instance to the disk for servicing the new instance of the cloud service instantiated in the target cluster, the migration is performed in descending order of the migration priorities.

As shown in FIG. 3, data on disk A (301) is copied to disk B (303) by the execution of a background thread. When a read or write operation is performed on the new instance during such copying, it is determined whether the data involved in a read or write request, including the read or write operation, exists on disk B (303). In response to the determination that the data does exist on disk B (303), the read or write operation included in the read or write request is performed for disk B. Otherwise, in response to the determination that the data associated with the new instance does not exist on disk B (303) (e.g., the required data has not yet been copied to disk B 303), the migration priority of the data associated with the new instance is changed from a low migration priority to a high migration priority. Based on this, the data of the high migration priority (e.g., the data associated with the new instance) is copied from disk A (301) to disk B (303), upon the completion of which the read or write operation included in the read or write request is performed for disk B (303). This implementation is a basis for asynchronous data copying, which leads to no need to wait for the data on disk A (301) to be copied entirely to disk B (303) before the new instance of the cloud server can start providing the service, thereby reducing interruption time (e.g., downtime) associated with the user service.

In one embodiment, the copying of the data on disk A (301) to disk B (303) is performed by splitting the data on disk A (301) associated with the original instance into at least one data block, and the data on disk A (301) associated with the original instance is copied to disk B (303) for servicing the new instance in the form of such data blocks. Additionally, the data on disk A (301) is copied to disk B (303) by image mirroring. In one example, the data one disk A (301) is split into at least one data block, then a data mirroring image corresponding to each data block is created, and the data on disk A (301) is copied to disk B (303) via data mirroring.

Further, a flag bit marking whether a data block has been copied can be configured for the data block. In one example, if the data block has been copied to disk B (303), the flag bit of the data block is marked as 1; if the data block has not been copied, the flag bit of the data block is marked as 0. Based on this, in the process of copying the data on disk A (301) to disk B (303), already copied data is compared with the data on disk A (301) based on the flag bits of data blocks to determine a copying progress of the data on disk A (301). In implementations, the comparison used to determine the copying progress of the data on disk A (301) is encapsulated into a migration progress query interface, at which the user can obtain real-time copying progress of copying the data on disk A (301) to disk B (303).

In general, the size of the data on a disk is the magnitude of hundreds of gigabytes or terabytes. On the assumption that disk data can be copied at a speed of about 100 GB per hour, techniques utilized by current systems take hours to copy the disk data, which is mirrored into mirror images for copying. In contrast, the technical solution of the disclosure provides a service interruption time of about two to three minutes, counting from the termination of the service provided by the original instance until the resuming of the provided service after the new instance of the cloud service is started. Thus, the technical solution of the disclosure provides more efficiency compared to hours of or longer service interruption time associated with current migration techniques.

Now referring back to FIG. 1, the process further includes step S103: configure a data operation of the cloud service for the disk for servicing the original instance as the data operation for the disk for servicing the new instance.

As described above, the original instance of the cloud service and the new instance of the cloud server each are configured with their respective processing queues. In one example, a data request (e.g., a request including a read or write request) including a data operation of the cloud server for the disk for servicing the original instance is enqueued to the processing queue of the original instance for processing. A read or write request that includes the data operation of the cloud server for the disk for servicing the new instance is enqueued to the processing queue of the new instance for processing.

Based on the above-described migrating of the disk data associated with the original instance of the cloud server from the source cloud server cluster to the disk for servicing a new instance of the cloud server instantiated in the target cloud server cluster based on the scheduled migration time, data operation(s) of the cloud server for a disk for servicing the original instance are configured as the data operation(s) for the disk for servicing the new instance such that to migrate the cloud service provided by the cloud server from the source cloud server cluster to the target cloud server cluster.

Referring to FIG. 3, the cloud server (305) (e.g., the original instance of the cloud server providing the cloud service) reads data from disk A (301) and writes data to disk A (301). When an upper layer of the cloud system issues a migration instruction relating to disk A (301), disk A (301) stops all the read and write operations, and the processing queue of the original instance stops processing the read request and write requests enqueued therein. Further, disk A (301) is marked with a to-be-deleted state, and disk B (303) for servicing the cloud server is allocated in the target cloud server cluster. Next, disk B (303) starts servicing read and write requests after being allocated, and a read request or a write request including a read operation or write operation for disk B (303) is enqueued to the processing queue of the new instance. The read operations and write operations of the new instance are all performed for disk B (303). After the processing queue of the original instance stops processing the read requests and write requests enqueued therein, the read requests and write requests, that are still in the processing queue of the original instance and the processing of which is not yet complete, are transferred to the processing queue of the new instance for processing.

In some embodiments, the cloud server is migrated in a manner of "live migration" from the source cloud server cluster to the target cloud server cluster. In one example, compared to the above-described migration, before a read or write operation of the cloud server for the disk for servicing the original instance is stopped (e.g., before the service of the original instance is stopped), the new instance is instantiated, and the disk for servicing the instance is allocated in the target cloud server cluster. Also, the new instance and the disk for servicing the new instance are correspondingly configured, after the completion of which the new instance is started. After the new instance is started, the memory data associated with the original instance is copied to the memory associated with the execution of the new instance, and the execution state data related to the executing state(s) (e.g., CPU state, register state) of the original instance is further copied to the new instance until the execution state data related to the execution state of the original instance is less than a pre-configured threshold. Afterward, the read operation and write operations of the cloud server for the disk for servicing the original instance (e.g., disk A 301) is stopped, the remaining execution state data is copied to the new instance, and data operations of the cloud server for the disk for servicing the original instance (e.g., disk A 301) is configured as data operations for the disk for servicing the new instance (e.g., disk B 303), thereby realizing the migration of the cloud server. Using live migration techniques to migrate the cloud server, service interruption times are shorter and can be controlled within the order of milliseconds or even microseconds, achieving more efficient migration of the cloud server.

According to various embodiments, the cloud service migration solution provides that, in the process of migrating the cloud server from the source cloud server cluster to the target cloud server cluster, based on a scheduled migration time that is specified by a user and included in the migration request, the cloud server is migrated from the source cloud server cluster to the target cloud server cluster based on the scheduled migration time. Data operation(s) of the cloud service for a disk in the source cloud server cluster is re-configured as data operation(s) for a disk in the target cloud server cluster to provide the service by a new instance in the target cloud server cluster. As such, the cloud server is migrated from the source cloud server cluster to the target cloud server cluster with simple implementation, as well as reduced service interruption times caused by the interruption of the service provided by a cloud service instance, achieving more efficient and convenient migration.

Figure 4:
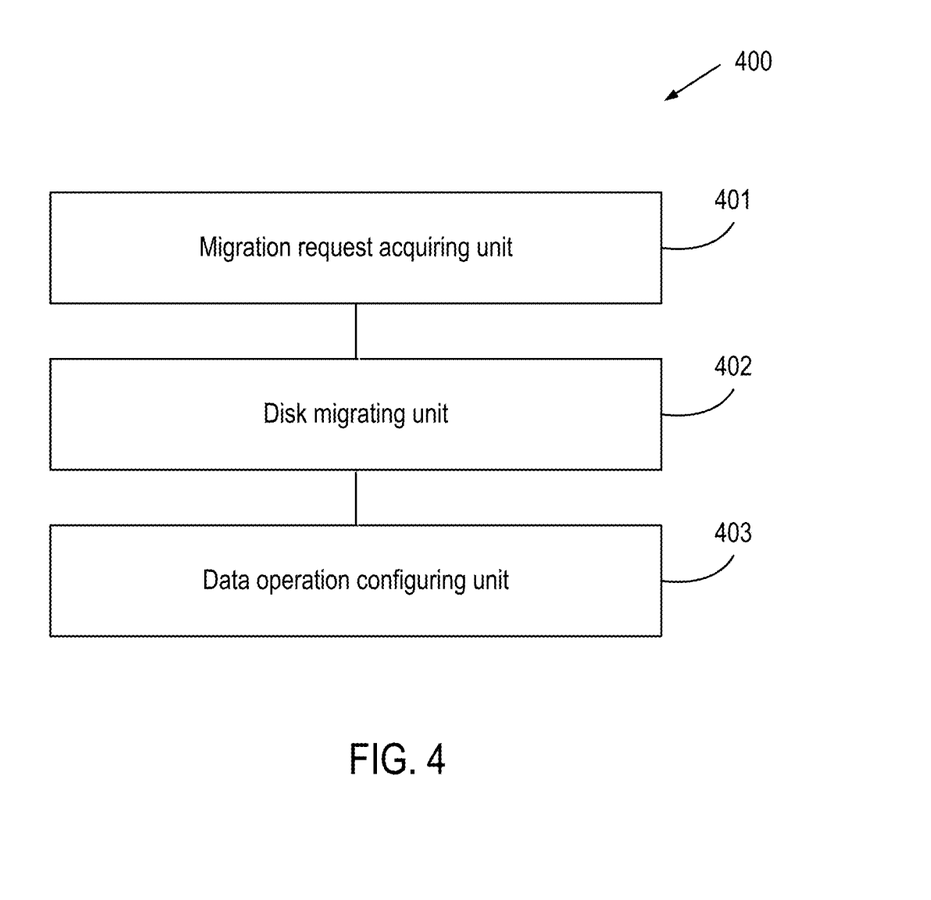
FIG. 4 is a block diagram illustrating an apparatus for cloud service migration according to some embodiments of the disclosure.

FIG. 4 is a block diagram illustrating an example apparatus for cloud service migration according to some embodiments of the disclosure. The cloud service migration apparatus is substantially similar to the method for cloud service migration described above, and the details are not repeated herein for simplicity.

As shown in FIG. 4, the apparatus (400) for service migration includes a migration request obtaining unit (401), a disk migrating unit (402), and a data operation configuring unit (403).

The migration request obtaining unit (401) is configured to obtain a migration request related to a cloud service hosted in a source cluster, the migration request including a scheduled migration time to migrate the cloud service from the source cluster to a target cluster.

The disk migrating unit (402) is configured to migrate, based on the scheduled migration time, the disk data associated with an original instance of the cloud service to a disk for servicing a new instance of the cloud service instantiated in the target cluster, based on a migration priority order of the disk data.

The data operation configuring unit (403) is configured to configure data operation(s) of the cloud service for a disk for servicing the original instance as data operation(s) for the disk for servicing the new instance.

In one embodiment, the apparatus (400) for cloud service migration further includes a new instance instantiating unit, a configuration unit, and a new instance starting unit.

The new instance instantiating unit is configured to instantiate the new instance of the cloud service in the target server cluster.

The configuration unit is configured to configure the new instance and resource components associated with the new instance.

The new instance starting unit is configured to stop the original instance at the source server cluster; and start the new instance based on the resource components.

In some embodiments, the configuration unit includes one or both of a first new instance configuring subunit and a second new instance configuring subunit.

The first new instance configuring subunit is configured to configure, based on the configuration information of the original instance, the new instance in the target cluster using the same configuration as the configuration information.

The second new instance configuring subunit is configured to configure the new instance based on the configuration information obtained through a pre-configured configuration interface.

In some embodiments, the resource components include a disk. In some other embodiments, the resource components further include at least one of the following: a CPU, a memory, an operating system, and network connection.

In some embodiments, the configuration unit includes a network port allocating subunit, and a network port migrating subunit.

The network port allocating subunit is configured to allocate a network port in the target cluster.

The network port migrating subunit is configured to release the cloud service from a network port at the source cluster; configure the cloud service to the network port allocating at the target cluster; and perform routing update.

In some embodiments, the configuration unit includes a data operation stopping subunit, and a disk allocating subunit.

The data operation stopping subunit is configured to stop the data operations of the cloud service for the disk for servicing the original instance.

The disk allocating subunit is configured to allocate the disk for servicing the new instance in the target cluster.

In some embodiments, the data operation configuring unit (403) includes one or both of a first copying subunit and a second copying subunit.

The first copying subunit is configured to split the disk data associated with the original instance into at least one data block, and to copy the disk data associated with the original instance to the disk for servicing the new instance in the form of data blocks.

The second copying subunit is configured to split the disk data associated with the original instance into at least one data block, create a data mirroring image corresponding to each data block, and copy the disk data associated with the original instance to the disk for servicing the new instance via data mirroring.

In some embodiments, the data block is configured with a flag bit for marking whether the data block has been copied. In the process of copying the disk data associated with the original instance to the disk for servicing the new instance, already-copied data is compared with the disk data associated with the original instance based on the flag bit to determine a copying progress for the disk data associated with the original instance.

In some embodiments, the original instance and the new instance are each configured with their respective processing queues. A data request including a data operation of the cloud service for the disk for servicing the original instance is enqueued to the processing queue of the original instance; and a data request including a data operation of the cloud service for the disk for servicing the new instance is enqueued to the processing queue of the new instance.

In some embodiments, after the data operation configuring unit (403) is started into execution, a data request including a data operation of the cloud service for the disk for servicing the new instance is enqueued to the processing queue of the new instance. Further, a data request, that remains in the processing queue of the original instance and the processing for which is not completed, is transferred to the processing queue of the new instance for processing.

In some embodiments, a migration priority of the disk data is determined by the following steps. First, determining whether the data involved in the data request exists in the disk for servicing the new instance. In response to determining that the data involved in the data request does not exist in the disk for servicing the new instance, configuring a migration priority of the data involved in the data request to a high migration priority.

Second, in the process of migrating the disk data associated with the original instance to the disk for servicing the new instance of the cloud service instantiated in the target cluster, performing the migration in descending order of migration priorities.

In some embodiments, the apparatus (400) further includes a determining subunit, which is executed in the process of processing a data request in the processing queue of the new instance.

The determining subunit is configured to determine whether the data involved in the data request exists in the disk for servicing the new instance. In response to determining that the data involved in the data request exists in the disk for servicing the new instance, the determining subunit is configured to perform a data operation included in the data request based on the disk for servicing the new instance. Otherwise, in response to determining that the data involved in the data request does not exist in the disk for servicing the new instance, the determining subunit is configured to preferentially migrate the data of the high migration priority from the disk for servicing the original instance to the disk for servicing the new instance, and perform a data operation included in the data request based for the disk for servicing the new instance upon the completion of the migration.

In some embodiments, the source cluster and the target cluster are configured in different availability zones.

In some embodiments, the cloud service is configured as a cloud server for providing a cloud computing service. In some embodiments, the source cluster is configured as a cloud server cluster of at least one cloud server, and the target cluster is configured as a cloud server cluster of at least one cloud server.

Figure 5:
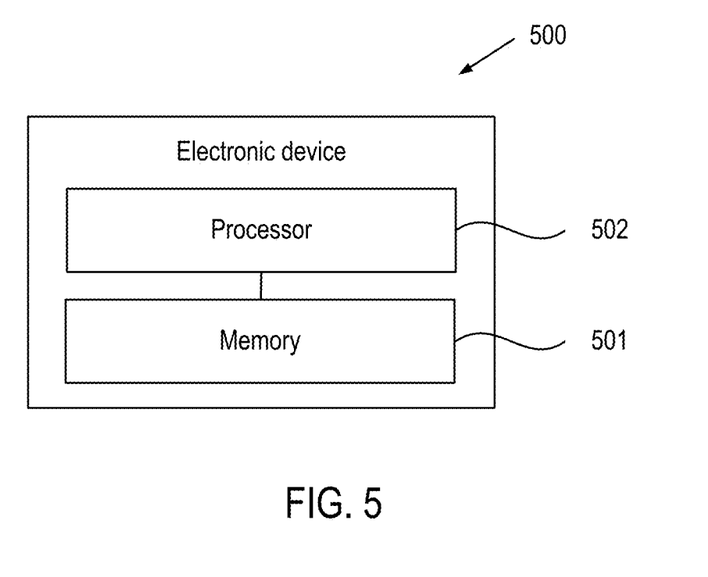
FIG. 5 is a block diagram illustrating an electronic device for cloud service migration according to some embodiments of the disclosure.

FIG. 5 is a block diagram of an example electronic device for cloud service migration according to some embodiments of the present disclosure. As the functionalities of the electronic device are substantially similar to the above-described methods for cloud service migration, the details of which are not repeated herein.

As shown in FIG. 5, the electronic device for cloud service migration includes a memory (501), and a processor (502).

The memory (501) is configured to store computer-executable instructions. The processor (502) is configured to read and execute the computer-executable instructions stored in the memory (501) to cause the electronic device (500) to perform the operations including the following steps.

Step one: obtaining a migration request related to a cloud service hosted in a source cluster, the migration request including a scheduled migration time to migrate the cloud service from the source cluster to a target cluster.

Step two: migrating, based on the scheduled migration time, the disk data associated with an original instance of the cloud service to a disk for servicing a new instance of the cloud service instantiated in the target cluster, the migration of the disk data being performed based on a migration priority order of the disk data.

Step three: configuring data operation(s) of the cloud service for a disk for servicing the original instance as data operation(s) for the disk for servicing the new instance.

In some embodiments, before configuring data operation(s) of the cloud service for a disk for servicing the original instance as data operation(s) for the disk for servicing the new instance, the processor (502) is further configured to execute the following computer-readable instructions: instantiating the new instance in the target cluster; configuring the new instance and resource components associated with the new instance; stopping the original instance at the source cluster, and starting the new instance based on the resource components.

In some embodiments, the configuring of the new instance and resource components associated with the new instance is implemented by configuring, based on the configuration information of the original instance, the new instance in the target cluster using the same configuration as the configuration information; or configuring the new instance based on the configuration information obtained through a pre-configured configuration interface.

In some embodiments, the resource components include a disk. In other embodiments, the resource components further include at least one of the following: a CPU, a memory, an operating system, and a network connection.

In some embodiments, the configuring of the new instance and resource components associated with the new instance includes: allocating a network port in the target cluster; releasing the cloud service from a network port of the source cluster; configuring the cloud service to the network port allocated at the target cluster; and performing routing update.

In some embodiments, the configuring of the new instance and resource components associated with the new instance includes: stopping the data operation of the cloud service for the disk for servicing the original instance; allocating the disk for servicing the new instance in the target cluster; and after the allocation of the disk for servicing the new instance is completed, executing the instructions to migrate, based on the scheduled migration time, the disk data associated with an original instance of the cloud service to a disk for servicing a new instance of the cloud service instantiated in the target cluster, and to configure data operation(s) of the cloud service for a disk for servicing the original instance as data operation(s) for the disk for servicing the new instance.

In some embodiments, the migrating of the disk data associated with an original instance of the cloud service to a disk for servicing a new instance of the cloud service instantiated in the target cluster is implemented by splitting the disk data associated with the original instance into at least one data block, and copying the disk data associated with the original instance to the disk for servicing the new instance in the form of data blocks; or splitting the disk data associated with the original instance into at least one data block, creating a data mirroring image corresponding to each data block, and copying the disk data of the original instance to the disk of the new instance via data mirroring.

In some embodiments, the data block is configured with a flag bit for marking whether the data block has been copied. In the process of copying the disk data associated with the original instance to the disk for servicing the new instance, already-copied data is compared with the disk data associated with the original instance based on the flag bit to determine copying progress for the disk data associated with the original instance.

In some embodiments, the original instance and the new instance are each configured with their respective processing queues. A data request including a data operation of the cloud service for the disk for servicing the original instance is enqueued to the processing queue of the original instance, and a data request including a data operation of the cloud service for the disk for servicing the new instance is enqueued to the processing queue of the new instance.

In some embodiments, after the configuring of the data operation(s) of the cloud service for a disk for servicing the original instance as the data operation(s) for the disk for servicing the new instance, a data request including a data operation of the cloud service for the disk for servicing the new instance is enqueued to the processing queue of the new instance, and a data request that remains in the processing queue of the original instance and the processing of which is not yet complete is transferred to the processing queue of the new instance for processing.

In some embodiments, a migration priority of the disk data is determined by determining whether the data involved in the data request exists in the disk for servicing the new instance; in response to determining that the data involved in the data request does not exist in the disk for servicing the new instance, configuring a migration priority of the data involved in the data request to a high migration priority; and in the process of migrating the disk data associated with the original instance to the disk for servicing the new instance of the cloud service instantiated in the target cluster, performing the migration in a descending order of migration priorities.

In some embodiments, the processing of a data request in the processing queue of the new instance includes the following operations: determining whether the data involved in the data request exists in the disk for servicing the new instance; in response to determining that the data involved in the data request exists in the disk for servicing the new instance, performing a data operation included in the data request for the disk for servicing the new instance; in response to determining that the data involved in the data request does not exist in the disk for servicing the new instance, migrating the data of the high migration priority from the disk for servicing the original instance to the disk for servicing the new instance, and performing a data operation included in the data request for the disk for servicing the new instance upon the completion of the migration.

In some embodiments, the source cluster and the target cluster are configured in different availability zones.

In some embodiments, the cloud service is configured as a cloud server for providing a cloud computing service. In other embodiments, the source cluster includes a cloud server cluster of at least one cloud server, and the target cluster includes a cloud server cluster of at least one cloud server.

The disclosure has been disclosed above through preferred embodiments but is not intended to be limited thereto. Possible variations and modifications can be made by those skilled in the art without departing from the spirit and scope of the disclosure. Therefore, the protection scope of the disclosure shall be defined by the claims of the disclosure.

In a typical configuration, the computing device includes one or a plurality of processors (CPUs), input/output interfaces, network interfaces, and memories.

The memory may include a computer-readable medium in the form of a non-permanent memory, a random access memory (RAM) or non-volatile memory or the like, such as read-only memory (ROM) or a flash memory (flash RAM). The memory is an example of a computer-readable medium.

The computer-readable medium includes permanent and non-permanent, movable and non-movable media that can achieve information storage by means of any methods or techniques. The information may be computer-readable instructions, data structures, modules of programs, or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include non-transitory computer-readable media (transitory media), such as a modulated data signal and a carrier wave.

Those skilled in the art should understand that embodiments of the disclosure may be provided as a method, a system, or a computer program product. Therefore, the disclosure may use the form of a full hardware embodiment, a full software embodiment, or an embodiment combining software and hardware. Moreover, the disclosure may use the form of a computer program product implemented on one or a plurality of computer-usable storage media (including, but not limited to, a magnetic disk memory, a CD-ROM, an optical memory, and so on) containing computer-usable program code therein.

The invention claimed is:

1. A method comprising:
    executing a cloud service on a cloud server, the cloud service comprising a first application hosted within an availability zone of a source cluster;
    queuing a set of data requests in an original processing queue associated with the first application, the set of data requests received while the first application is active;
    obtaining a migration request associated with the cloud service, the migration request comprising a scheduled migration time to migrate the cloud service from the source cluster to a target cluster;
    instantiating a new instance of the cloud service, the new instance of the cloud service comprising a second application executing on a second cloud server within a second availability zone of a target cluster, wherein the first application and second application provide a same functionality;
    migrating, based on the scheduled migration time and a migration priority order, disk data associated with the first application to a disk associated with the new instance of the cloud service;
    configuring a data operation of the cloud service for a disk associated with the first application as a data operation for the disk associated with the new instance of the cloud service;
    enqueuing a data request comprising a data operation of the cloud service for the disk associated with the new instance to a second processing queue of the new instance for processing;
    transferring one or more of the set of data requests from the original processing queue to the second processing queue, the second processing queue including data requests from the original processing queue and data requests enqueued for the disk associated with the new instance;
    determining that data involved in the data request does not exist in the disk associated with the new instance, and, in response to the determination, configuring the migration priority of the data involved in the data request to a first migration priority from a second migration priority, wherein the first migration priority causes the data involved in the data request to be migrated earlier than the second migration priority; and
    migrating the disk data associated with the original instance to the disk associated with the new instance of the cloud service instantiated in the target cluster in a descending order of migration priorities.

2. The method of claim 1, further comprising:
    instantiating the new instance in the target cluster;
    configuring resource components associated with the new instance;
    terminating the original instance at the source cluster; and
    starting, prior to configuring the data operation, the new instance based on the resource components at the target cluster.

3. The method of claim 2, the configuring resource components associated with the new instance comprising configuring the new instance in the target cluster based on configuration information, the configuration information selected from the group consisting of configuration of the original instance and configuration information obtained via a pre-configured configuration interface.

4. The method of claim 1, the migrating disk data associated with the original instance of the cloud service to the disk associated with the new instance of the cloud service instantiated in the target cluster comprising one or more of:
    splitting the disk data associated with the original instance into at least one data block, and copying the disk data associated with the original instance to the disk associated with the new instance in the form of data blocks; and
    splitting the disk data associated with the original instance into at least one data block, generating a data mirroring image corresponding to each data block, and copying the disk data associated with the original instance to the disk associated with the new instance via data mirroring.

5. The method of claim 4, the data block being configured with a flag bit for marking whether the data block has been copied, the method further comprising:
    comparing data copied to the disk associated with the new instance with the disk data associated with the original instance based on the flag bit; and
    determining a copying progress of the disk data associated with the original instance based on a result of the comparing.

6. The method of claim 1, further comprising:
    determining whether data involved in the data request exists in the disk associated with the new instance; and
    in response to determining that the data involved in the data request does not exist in the disk associated with the new instance, migrating the data of the first migration priority from the disk associated with the original instance to the disk associated with the new instance, and performing the data operation comprised in the data request for the disk associated with the new instance upon completion of migration.

7. A non-transitory computer-readable storage medium for tangibly storing computer program instructions capable of being executed by a computer processor, the computer program instructions defining the steps of:
    executing a cloud service on a cloud server, the cloud service comprising a first application hosted within an availability zone of a source cluster;

queuing a set of data requests in an original processing queue associated with the first application, the set of data requests received while the first application is active;

obtaining a migration request associated with the cloud service, the migration request comprising a scheduled migration time to migrate the cloud service from the source cluster to a target cluster;

instantiating a new instance of the cloud service, the new instance of the cloud service comprising a second application executing on a second cloud server within a second availability zone of a target cluster, wherein the first application and second application provide a same functionality;

migrating, based on the scheduled migration time and a migration priority order, disk data associated with the first application to a disk associated with the new instance of the cloud service;

configuring a data operation of the cloud service for a disk associated with the first application as a data operation for the disk associated with the new instance of the cloud service;

enqueuing a data request comprising a data operation of the cloud service for the disk associated with the new instance to a second processing queue of the new instance for processing;

transferring one or more of the set of data requests from the original processing queue to the second processing queue, the second processing queue including data requests from the original processing queue and data requests enqueued for the disk associated with the new instance;

determining that data involved in the data request does not exist in the disk associated with the new instance, and, in response to the determination, configuring, the migration priority of the data involved in the data request to a first migration priority from a second migration priority, wherein the first migration priority causes the data involved in the data request to be migrated earlier than the second migration priority; and migrating the disk data associated with the original instance to the disk associated with the new instance of the cloud service instantiated in the target cluster in a descending order of migration priorities.

8. The non-transitory computer-readable storage medium of claim 7, the computer program instructions further defining the steps of:
instantiating the new instance in the target cluster;
configuring resource components associated with the new instance;
terminating the original instance at the source cluster; and
starting, prior to configuring the data operation, the new instance based on the resource components at the target cluster.

9. The non-transitory computer-readable storage medium of claim 8, the configuring resource components associated with the new instance comprising configuring the new instance in the target cluster based on configuration information, the configuration information selected from the group consisting of configuration of the original instance and configuration information obtained via a pre-configured configuration interface.

10. The non-transitory computer-readable storage medium of claim 7, the computer program instructions further defining the step of migrating disk data associated with the original instance of the cloud service to the disk associated with the new instance of the cloud service instantiated in the target cluster, the migrating step comprising one or more of:
splitting the disk data associated with the original instance into at least one data block, and copying the disk data associated with the original instance to the disk associated with the new instance in the form of data blocks; and
splitting the disk data associated with the original instance into at least one data block, generating a data mirroring image corresponding to each data block, and copying the disk data associated with the original instance to the disk associated with the new instance via data mirroring.

11. The non-transitory computer-readable storage medium of claim 10, the data block being configured with a flag bit for marking whether the data block has been copied, and the computer program instructions further defining the steps of:
comparing data copied to the disk associated with the new instance with the disk data associated with the original instance based on the flag bit; and
determining a copying progress of the disk data associated with the original instance based on a result of the comparing.

12. The non-transitory computer-readable storage medium of claim 7, the steps further comprising:
determining whether data involved in the data request exists in the disk associated with the new instance; and
in response to determining that the data involved in the data request does not exist in the disk associated with the new instance, migrating the data of the first migration priority from the disk associated with the original instance to the disk associated with the new instance, and performing the data operation comprised in the data request for the disk associated with the new instance upon completion of migrating the data of the first migration priority from the disk associated with the original instance to the disk associated with the new instance.

13. An electronic device comprising:
a processor; and
a storage medium for tangibly storing thereon program logic for execution by the processor, the stored program logic comprising:
logic, executed by the processor, for executing a cloud service on a cloud server, the cloud service comprising a first application hosted within an availability zone of a source cluster;
logic, executed by the processor, for queuing a set of data requests in an original processing queue associated with the first application, the set of data requests received while the first application is active;
logic, executed by the processor, for obtaining a migration request associated with the cloud service, the migration request comprising a scheduled migration time to migrate the cloud service from the source cluster to a target cluster;
logic, executed by the processor, for instantiating a new instance of the cloud service, the new instance of the cloud service comprising a second application executing on a second cloud server within a second availability zone of a target cluster, wherein the first application and second application provide a same functionality;
logic, executed by the processor, for migrating, based on the scheduled migration time and a migration priority order, disk data associated with the first application to a disk associated with the new instance of the cloud service;

logic, executed by the processor, for configuring a data operation of the cloud service for a disk associated with the first application as a data operation for the disk associated with the new instance of the cloud service;

logic, executed by the processor, for enqueuing a data request corn prising a data operation of the cloud service for the disk associated with the new instance to a second processing queue of the new instance for processing;

logic, executed by the processor, for transferring one or more of the set of data requests from the original processing queue to the second processing queue, the second processing queue including data requests from the original processing queue and data requests enqueued for the disk associated with the new instance;

logic, executed by the processor, for determining that data involved in the data request does not exist in the disk associated with the new instance, and, in response to the determination, configuring the migration priority of the data involved in the data request to a first migration priority from a second migration priority, wherein the first migration priority causes the data involved in the data request to be migrated earlier than the second migration priority; and logic, executed by the processor, for migrating the disk data associated with the original instance to the disk associated with the new instance of the cloud service instantiated in the target cluster in a descending order of migration priorities.

14. The electronic device of claim 13, the stored program logic further comprising:

logic, executed by the processor, for instantiating the new instance in the target cluster, logic, executed by the processor, for configuring resource components associated with the new instance, logic, executed by the processor, for terminating the original instance at the source cluster, and logic, executed by the processor, for c starting, prior to configuring the data operation, the new instance based on the resource components at the target cluster.

15. The electronic device of claim 14, the logic for configuring resource components associated with the new instance comprising:

logic, executed by the processor, for configuring the new instance in the target cluster based on configuration information, the configuration information selected from the group consisting of configuration of the original instance and configuration information obtained via a pre-configured configuration interface.

16. The electronic device of claim 13, the logic for migrating disk data associated with the original instance of the cloud service to the disk associated with the new instance of the cloud service instantiated in the target cluster comprising one or more of:

logic, executed by the processor, for splitting the disk data associated with the original instance into at least one data block, and copying the disk data associated with the original instance to the disk associated with the new instance in the form of data blocks; and logic, executed by the processor, for splitting the disk data associated with the original instance into at least one data block, generating a data mirroring image corresponding to each data block, and copying the disk data associated with the original instance to the disk associated with the new instance via data mirroring.

17. The electronic device of claim 16, the data block being configured with a flag bit for marking whether the data block has been copied, and the stored program logic further compnsmg:

logic, executed by the processor, for comparing data copied to the disk associated with the new instance with the disk data associated with the original instance based on the flag bit; and logic, executed by the processor, for determining a copying progress of the disk data associated with the original instance based on a result of the comparing.

18. The electronic device of claim 13, the stored program logic further comprising:

logic, executed by the processor, for determining whether data involved in the data request exists in the disk associated with the new instance; and logic, executed by the processor, for, in response to determining that the data involved in the data request does not exist in the disk associated with the new instance, migrating the data of the first migration priority from the disk associated with the original instance to the disk associated with the new instance, and performing the data operation comprised in the data request for the disk associated with the new instance upon completion of migrating the data of the first migration priority from the disk associated with the original instance to the disk associated with the new instancemigration.

* * * * *